Oct. 3, 1967 L. J. KULZER 3,344,501
CONSTRUCTION OR REPAIR OF GUIDE PASSAGES
Filed May 10, 1965
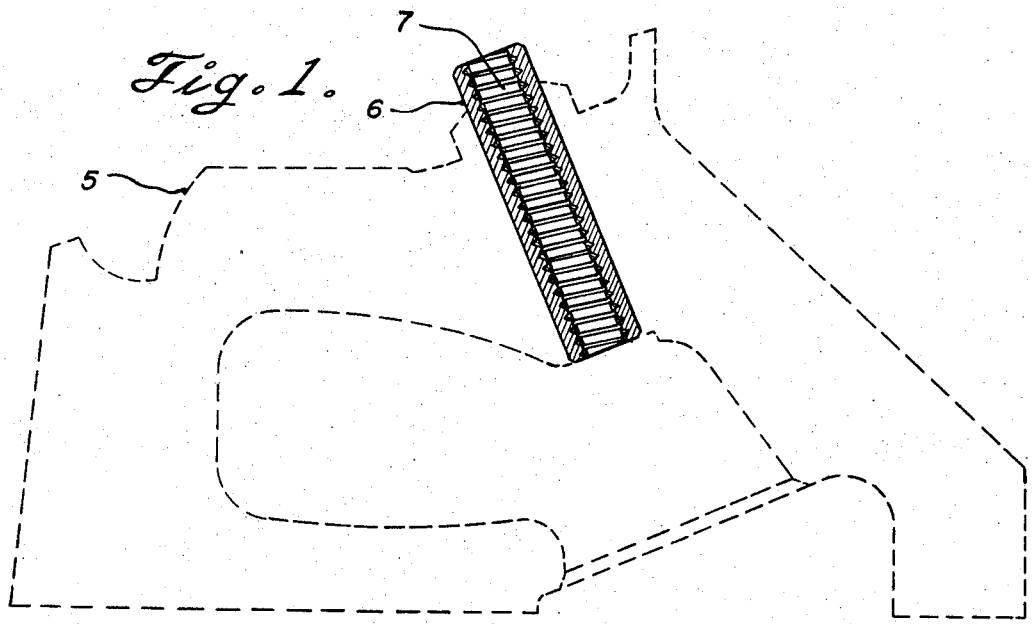
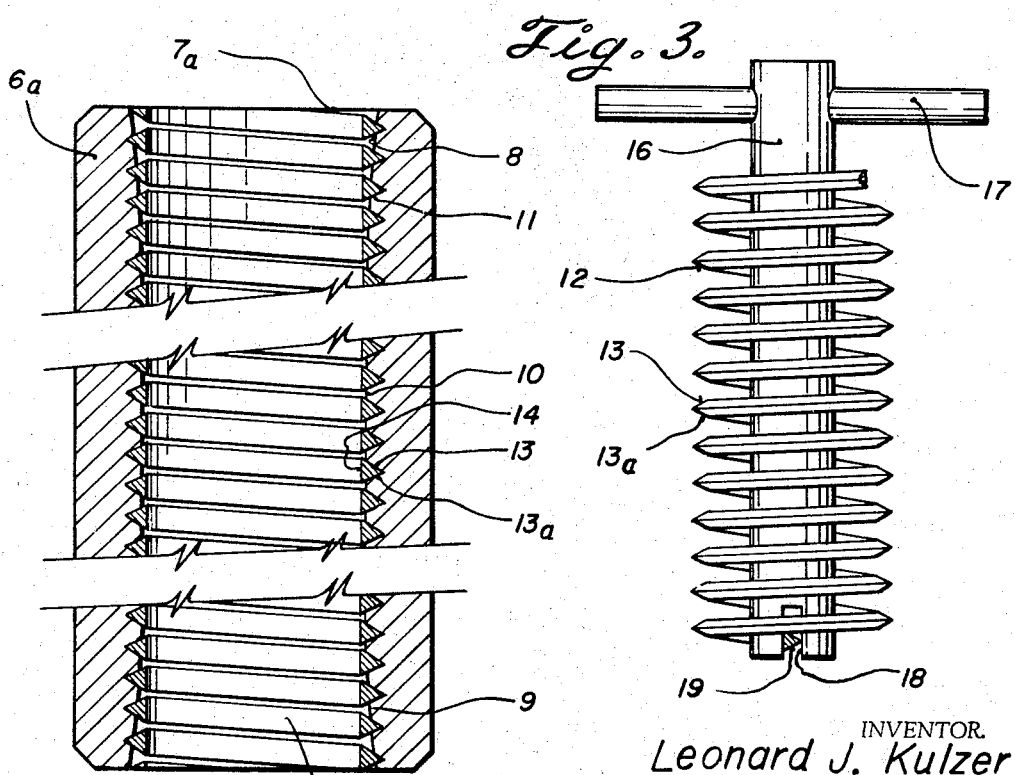
INVENTOR.
Leonard J. Kulzer
BY
Whiteley and Caine
ATTORNEYS

United States Patent Office 3,344,501
Patented Oct. 3, 1967

3,344,501
CONSTRUCTION OR REPAIR OF GUIDE PASSAGES
Leonard J. Kulzer, 1909 W. 5th St., Winona, Minn. 55987
Filed May 10, 1965, Ser. No. 454,386
3 Claims. (Cl. 29—401)

This invention relates to improvements in the construction or repair of tubular passages that serve as bushings to support or guide movable members. A particular application of the invention is in the construction or repair of passages in a member or a machine, such as an internal combustion engine, or parts thereof, that serve to support or guide a movable member, such as the stems of the lift or poppet valves.

In an internal combustion engine, the stems of each of the valve members extend through, and are guided by tubular passages, and after extensive use, the walls of these passages become worn and assume an irregular form which may bind the valves in their reciprocal movement and, therefore, require repair. The present mode of correcting wear in these guide passages takes on one of two forms; either the passage in the member is enlarged by reaming the interior thereof, whence a tubular insert is hammered into the newly formed passage, or alternately, the passage is enlarged by reaming, whence new valves with oversized stems are used. In some engines, independent sleeves are used as the guide members, and these sleeves may either be replaced or repaired in a manner similar to that previously described. Either of the foregoing procedures is relatively expensive, and leads to inaccuracy in reforming the guide passages.

In the present invention, I have provided a method and means of repairing members containing worn guide passages, or constructing new members containing guide passages, in a manner as to produce a product which is superior in several respects to either the original product, or of the present mode of producing the original product. According to the present invention, the guideway or passage in the member is tapped to provide a spiral thread extending through the member. Into the thread thus formed is inserted a bushing composed of precoiled wire, preferably formed of bronze or other suitable metal, and in which the wire forming the coil is substantially triangular in cross section, providing beveled surfaces that engage the newly cut thread, and with a relatively flat surface projecting inwardly within the passage, the spaced spiral turns thereof forming a new cylindrical surface. This inner surface is thus composed of the flat surface of the wire forming the spaced spiral turns of the coil. While the interior of the newly formed cylindrical wall could conceivably be correct for the intended use as a bushing or guideway, it is desirable to lock the coil within the thread cut in the body member, and this may be accomplished by forcing a tool through the newly formed passage. On the other hand, if the diameter of the passage is less than desired, the coil may be locked and the correct diameter obtained by passing a reaming tool through the passage to simultaneously obtain both results.

An object of the present invention is to provide a method of accurately forming a tubular surface within a member by inserting into a passage of the member a spiral coil composed of material that is substantially triangular in cross section, thus forming a central passage composed of spaced spiral turns.

Another object is to provide a method of repairing a worn bearing or guide in a member by forming a threaded surface in the interior of the passage and inserting into the newly formed thread a spiral coil composed of wire, which is substantially triangular in cross section, to thereby form a new bearing surface within the guide passage.

A further object is to provide a bushing composed of spaced spiral turns of a coil of a wire which is substantially triangular in cross section arranged to form a smooth cylindrical center wall with a thread on the outer wall.

Other and further objects may become apparent from the following specification and claims, and in the appended drawing in which:

FIG. 1 is a sectional view of a part of an internal combustion engine in which the present invention has been incorporated;

FIG. 2 is an enlarged sectional view of an independent guide member embodying the invention; and FIG. 3 is a side elevation of a wire coil forming the bushing disclosed in FIGS. 1 and 2, together with a tool for applying the coil.

Referring now to the several views of the drawing, the invention will be described in detail.

Having reference to FIG. 1, reference character 5 discloses in outline a portion of an internal combustion engine of conventional valve-in-head design. Formed as an integral part of the engine head 5 is a tubular guide member 6 containing an internal passage 7 that serves as a guide for the stem of a conventional lift or poppet valve, not shown. It is, of course, understood that each cylinder of the engine is provided with two valves that respectively control the input of fuel and the exit of the products of combustion. The member 6 is disclosed in FIG. 1 as an integral part of the engine head 5; while in FIG. 2, the tubular member 6a is a similar structure having a central passage 7a that may be used in other forms of engines, or which, in fact, may serve as a bearing or bushing in some other combination.

Because of the reciprocal movement of the member, not shown, that reciprocates in the passages 7 or 7a, the interior of such passages may become worn, and under those conditions might cause sticking of the reciprocal movement of the member. In the case of an internal combustion engine, wherein the reciprocal member is a valve, the sticking thereof will cause faulty operation of the engine. Frequently the areas of wear of the passages 7 or 7a are adjacent the outer ends thereof so that the ends of the passage become "bell mouthed," as indicated by reference characters 8 and 9, at the opposite ends of member 6a in FIG. 2. If this condition occurs, the reciprocating member will not be adequately supported at the opposite ends of the passage 7a, worn guides will not guide a valve so that it seats properly, thereby causing leakage. Also, misalignment of the valve head and seat cause flexing of the valve stem which sets up a fatigue in the stem and will break the valve head off.

According to the present invention, the interior of the passage 7 or 7a is tapped or threaded to form a spiral thread 11, which extends throughout the entire interior area of the passage 7 or 7a. The stem of the tap is of the exact diameter of the original passage, and as it is drawn through the passage 7a from the bottom end thereof, the tap acts as a guide to assure positive alignment with the passage, since at least a part of the passage, such as the center 10, will not be worn.

Into the newly cut thread 11 is inserted a bushing 12 composed of a coil of wire which is substantially triangular in cross section. As disclosed in FIGS. 2 and 3, the wire forming coil 12 on its outer side has converging surfaces 13 and 13a, which engage the sides of the spiral thread 11, and with the remaining relatively flat inner surface 14, which forms the inner cylindrical surface of the bushing, which inner surface is designed at 15.

A careful examination of FIG. 2 reveals that despite the fact that the old passage 7a in the tubular member 6a is "bell mouthed," and that the portions of the thread 11 at the ends of the tube are not very deep; nevertheless, the inner surface 15 of the coil 12 forms a relatively true cylindrical surface for the reason that the coil 12 is composed of a relatively uniform diameter to conform to the diameter of the thread 11, at the center point 10.

The coil 12 is inserted into the thread 11 by means of a tool shown in FIG. 3, that is composed of a center cylindrical rod 16 provided with a crossbar 17 at one end thereof, and a slot 18 at the other end thereof, that is adapted to clinch and hold the outer end 19 of the coil 12. After the coil 12 has been inserted in the thread 11, the outer ends thereof are removed and the same is sheared or finished, as shown at the opposite ends of the tube 6a in FIG. 2, so as to conform to the linear dimensions of the tube.

After insertion into the thread 11, the coil 12 is secured therein, and this may be accomplished by forcing a tool through the center passage 15 from its lower end to wedge the several turns of the coil 12 into the thread 11. The inner diameter of the new bushing surface 15 constituting the inner flat sides 14 of the coil 12 may be of the desired diameter, which may be slightly smaller than the diameter of the passage 7a. But, if this is not true, then the new passage or bushing 15 may be formed to the proper size by passing a reamer through the passage 15 to enlarge it to the proper size, and coincidentally wedging the spaced turns of the coil into the thread 11.

There are a number of interesting aspects to the present invention. The coil or bushing is preferably formed of a bronze or brass, which makes an excellent bearing surface for either a rotatable or a reciprocating member. Lubricant carried by the shaft or reciprocating member, or otherwise introduced into the newly formed bushing will be lodged between the spaced turns of the coil, and therefore, provides a lubricating surface that was not available in the original passage. Should the bushing itself become worn, it may be removed and a new bushing inserted into the original threads.

The invention is not restricted to the repair of worn passages, but may be applied to provide a bushing of a superior character within new equipment.

The invention is defined in the terms of the appended claims.

I claim:

1. A method of composing a bushing within a linear passage in a member, comprising the steps of forming a helical groove of substantially constant diameter within the interior surface of said passage and guided from the axis of said passage at an area between the opposite ends thereof, inserting into said groove a helix composed of wire which conforms to the configuration of said groove, the interior surface of said helix forming a new passage of smaller diameter than the original passage, and removing a circular portion of the interior surface of said helix to form a guide passage composed of spaced spiral turns, the interior diameter of which is substantially uniform.

2. A method of composing a bushing within a linear passage in a member, comprising the steps of forming a helical groove of substantially constant diameter within the interior surface of said passage and guided from the axis of said passage at an area between the opposite ends thereof, inserting into said groove a helix composed of wire which conforms to the configuration of said groove, the interior surface of said helix forming a new passage of smaller diameter than the original passage, locking said helix within said groove, and removing a circular portion of the interior surface of said helix to form a guide passage composed of spaced spiral turns, the interior diameter of which is substantially uniform.

3. A method of repairing a worn valve guide passage in an internal combustion engine, comprising the steps of forming a helical groove of substantially constant diameter within the interior surface of said passage guided from the axis of said passage at the least worn area between its opposite ends, inserting into said groove a helix composed of wire which conforms to the configuration of said groove to entirely fill said groove and form a new passage of smaller diameter than the original passage, forcing a tool through the interior of said helix to interlock the turns of the helix with the turns of said groove, and reaming a portion of the interior surface of said helix to form a new guide passage composed of the spaced spiral turns of said helix, the interior diameter of which is substantially uniform.

References Cited

UNITED STATES PATENTS

| | | | |
|---|---|---|---|
| 1,966,520 | 7/1934 | Rayner | 85—64 |
| 2,244,824 | 6/1941 | Caminez | 29—240.5 |
| 3,185,531 | 5/1965 | Modrey | 208—4 |

JOHN F. CAMPBELL, *Primary Examiner.*

THOMAS H. EAGER, *Examiner.*